United States Patent [19]
Urbanek et al.

[11] Patent Number: 5,707,665
[45] Date of Patent: Jan. 13, 1998

[54] INJECTION MOULDING MACHINE HAVING AN INJECTION UNIT TILTABLE WITH A STATIONARY MOLD MOUNTING PLATE

[75] Inventors: Otto Urbanek, Linz; Heinz Leonhartsberger, Schwertberg, both of Austria

[73] Assignee: Engel Maschinenbau G.m.b.H., Schwersberg, Austria

[21] Appl. No.: 676,906

[22] Filed: Jul. 8, 1996

Related U.S. Application Data

[63] Continuation of Ser. No. 409,857, Mar. 23, 1995, abandoned.

[30] Foreign Application Priority Data

May 17, 1994 [AT] Austria ................. A 1013/94

[51] Int. Cl.[6] .................................................. B29C 45/64
[52] U.S. Cl. ................. 425/574; 425/450.1; 425/451.9; 425/589
[58] Field of Search ........................ 425/589, 574, 425/450.1, 451.9

[56] References Cited

U.S. PATENT DOCUMENTS

| | | | |
|---|---|---|---|
| 5,219,586 | 6/1993 | Yukihiro et al. | 425/574 |
| 5,249,951 | 10/1993 | Leonhartsberger et al. | 425/589 |

*Primary Examiner*—Tim Heitbrink
*Attorney, Agent, or Firm*—Notaro & Michalos P.C.

[57] ABSTRACT

An injection moulding machine having a machine frame (1), a stationary and a movable mould mounting plate (2,8) for fixing mould portions (4,9) and an injection unit (5) which opens into the mould through the stationary mould mounting plate (2), wherein the force applied by the closing mechanism is transmitted through the machine frame instead of through bar members and the injection unit (5) is in rigid connection with the stationary mould mounting plate (2).

5 Claims, 2 Drawing Sheets

INJECTION MOULDING MACHINE HAVING AN INJECTION UNIT TILTABLE WITH A STATIONARY MOLD MOUNTING PLATE

This application is a continuation, of application Ser. No. 08/409,857, filed Mar. 23, 1995 now abandoned.

FIELD AND BACKGROUND OF THE INVENTION

The invention relates to an injection moulding machine having a machine frame, a stationary and a movable mould mounting plate for fixing mould portions, and an injection unit which opens into the mould through the stationary mould mounting plate, wherein the force applied by the closing mechanism is transmitted through the machine frame instead of through bar members.

The advantage of a bar member-less injection moulding machine of that kind, as it is described in AT-A-391 293, lies in the ease of accessibility to the space between the mould mounting plates. The described design configuration deliberately relinquishes using an expensive massive structure to prevent the limbs of the U-shaped machine frame from moving away from each other by however small an amount, under the influence of the closing force. On the contrary, measures are used which would prevent that the mould also comes open upon pivotal movement of the fixed mould mounting plate as in that case the movable mould mounting plate would pivot in the same direction.

The basic starting point taken by the invention is the notion that the required parallelism of the mould halves, under the influence of the closing force, still would be safeguarded if the stationary mould mounting plate were to be pivoted further than is permitted nowadays. In the presentday structures, however, in which the injection unit is mounted independently of the stationary mould mounting plate, a relatively large pivotal movement of the stationary mould mounting plate would result in a change in the angle between the injection nozzle and the region of the mould, that co-operates therewith.

On the other hand, from the DE-U 92 12 480 a bar member-less injection moulding machine is known, wherein the fixed mould mounting plate is pivotally mounted at the machine frame. If the injection unit is mounted independently of the frame, the injection unit and the mould mounting plate remain in a parallel orientation also upon deformations of the frame. However, through a deformation of the frame at high closing forces the fixed mould mounting plates may be lifted by some extend, when the vertical legs of the U-type frame are pivoted.

SUMMARY OF THE INVENTION

The invention is based on the idea that it is possible to depart still further than hitherto from the concept of an absolutely rigid machine frame, if it is provided that the injection unit is in rigid connection to the stationary mould mounting plate.

If the fixed mould mounting plate is rigidly mounted to the respective vertical leg of the machine frame this means that the injection unit has to be connected to the machine frame such that it is following the common movements of the mould mounting plate and the frame, which result from the influence of the closing force. Especially, this may be achieved by providing that the injection unit is carried on a bracket which is connected to the free end of the stationary mould mounting plate forming a part of the machine frame.

In the case where the fixed mould mounting plate is pivotally connected to the machine frame, according to the invention the injection unit is rigidly connected to the mould mounting plate, and thus does not cooperate in an eventual pivotal movement of the frame.

BRIEF DESCRIPTION OF THE DRAWINGS

Two embodiments of the invention are described hereinafter with reference to the accompanying drawings.

DESCRIPTION OF THE PREFERRED EMBODIMENTS

Figure 1:
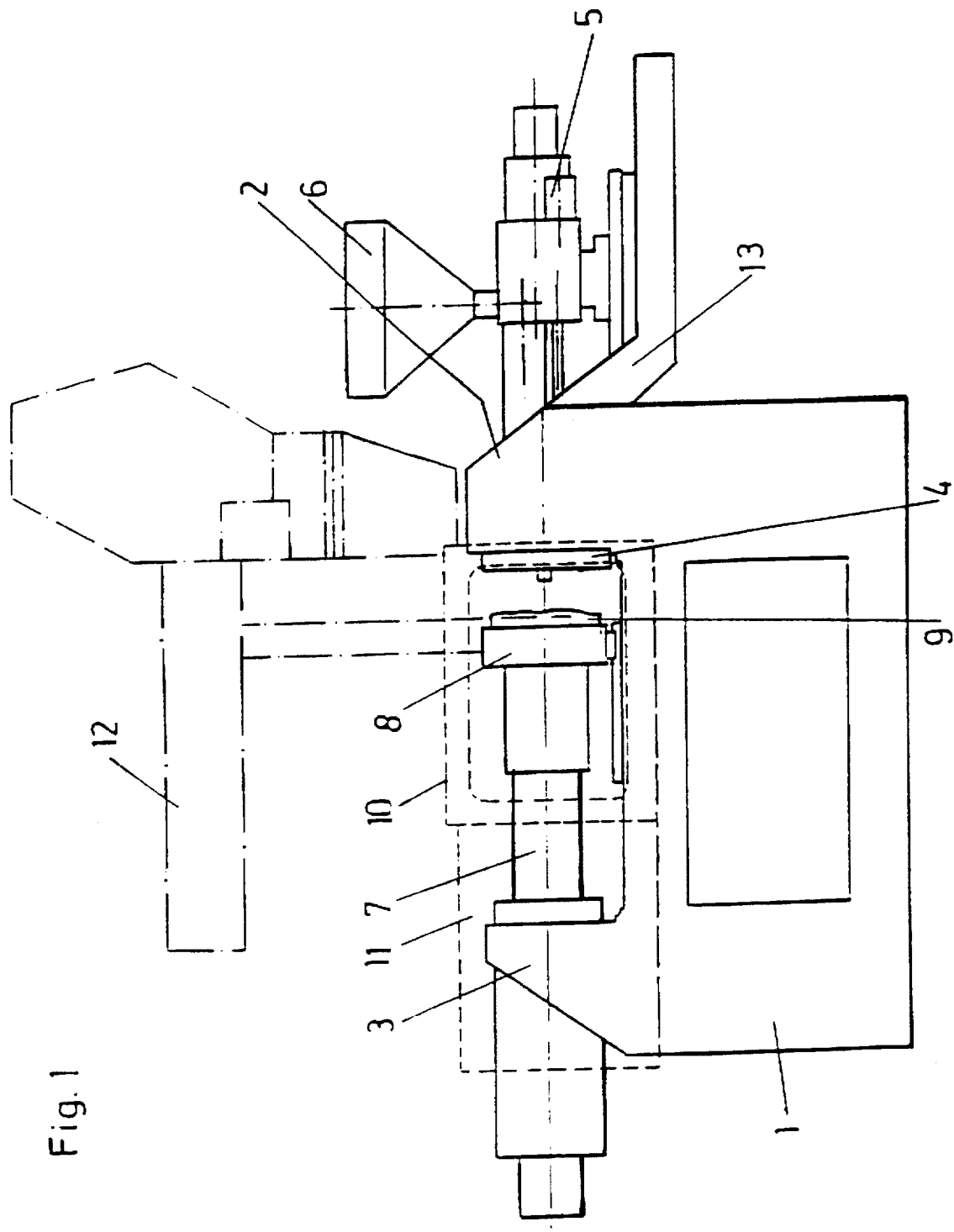
FIG. 1 shows a diagrammatic side view of an injection moulding machine according to the invention where the fixed mould mounting plate is rigidly mounted on the machine frame. According to FIG. 2 the fixed mould mounting plate is pivotally connected to the frame.

In the injection moulding machine of FIG. 1 the machine frame 1 which is made in one piece with the stationary mould mounting plate 2 and the cylinder plate 3. That means that the mould mounting plate 2 and the cylinder plate 3 are formed on the machine frame 1. The machine frame 1 is advantageously cast from spheroidal graphite iron, together with the mould mounting plate 2 and the cylinder plate 3.

The stationary mould mounting plate 2 carries a tool half 4. The cylinder plate 3 carries a piston cylinder unit 7 which in turn carries the movable mould mounting plate 8 with the mould half 9 and which forms the mechanism for holding the mould closed.

During the injection moulding procedure the movable mounting plate 8 is pressed against the mould mounting plate 2 by means of the piston cylinder unit 7. The space between the mould mounting plates 2 and 8 is free and therefore the tools 4 and 9 are easily accessible as there are no bar members.

It is possible to provide a protective guard grill 10 having guide rails by means of which it is displaceable on rollers of a stationary guard grill 11 so that access to the tool halves 4,9 is not impeded by the guard grill 10. A removal device 12 is also indicated in the drawing.

In known bar member-less injection moulding apparatuses, the injection unit 5 with the filling hopper 6 is possibly arranged displaceably on a support means which is not affected by the deformation of the stationary mould mounting plate 2 under the influence of the closing force. The invention in contrast lies in the step of transmitting to the injection unit 5 the slight tilting movement of the mould mounting plate 2 which occurs under the influence of the closing force, so that the injection unit 5 and the mould portion 4 always remain exactly aligned. For that purpose, connected to the free end of the mould mounting plate 2 is a cantilever bracket 13 on which the injection unit 5 rests. The injection unit 5 can be displaceable on the bracket 13 in known manner.

Figures 2, 2A:
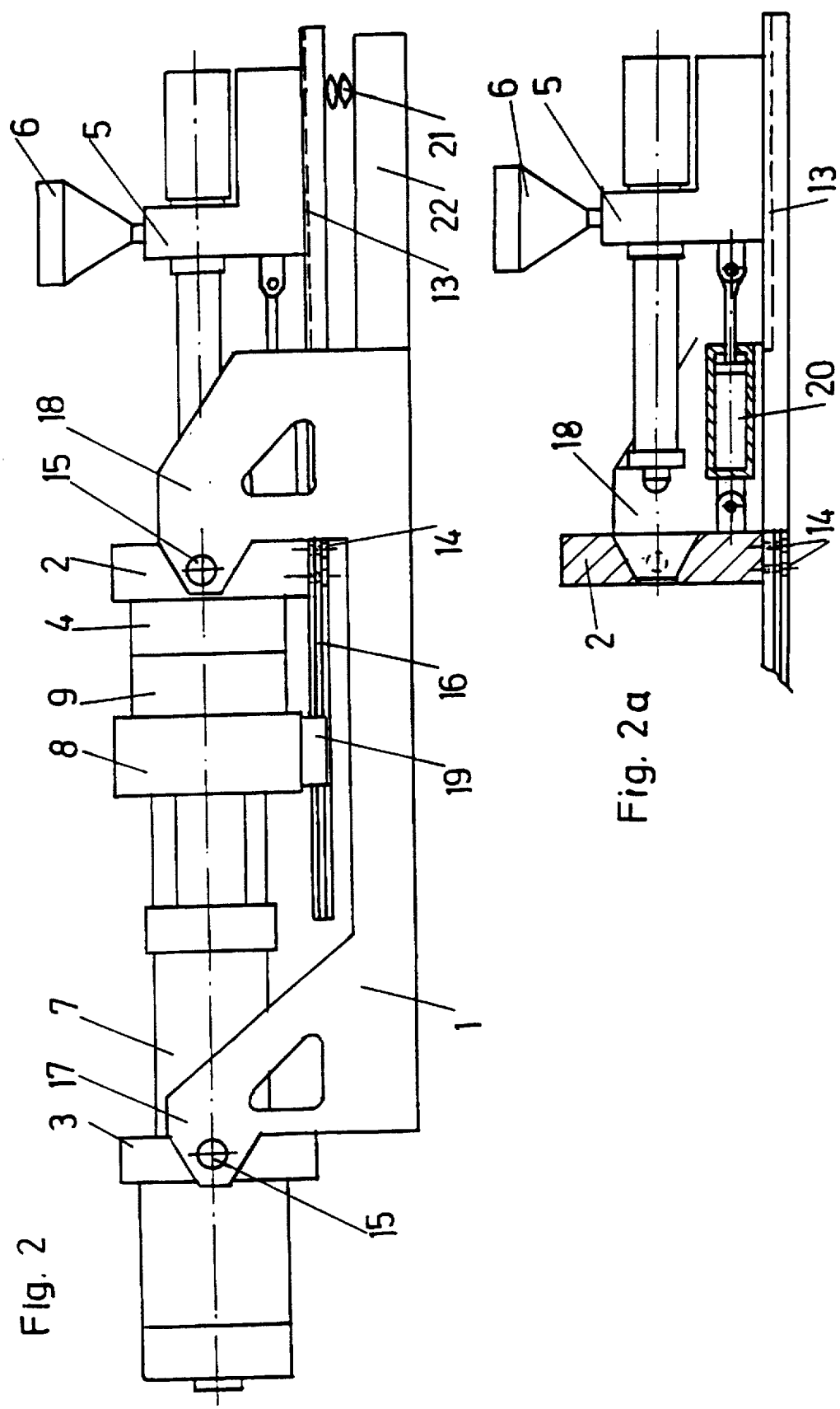
FIG. 2a shows a detail of FIG. 2 in a vertical cross section through the fixed mould mounting plate.

The embodiment according to FIG. 2 differs from the one of FIG. 1 essentially by the fact, that the cylinder plate 3 and the fixed mould mounting plate 2 are joined with hinges 15 to the paired legs 17 and 18 of the machine frame 1. The fixed mould mounting plate 2 in this case is connected with screws 14 to a rail 16 on which the movable mould mounting plate glides by means of a shoe. The rail 16 continues on the backside of the fixed mould mounting plate 2 and there constitutes the bracket 13, on which the injection unit is sliding by a hydraulic unit 20. For reducing the torque exerted on the fixed mould mounting plate 2 from the load of the injection unit 5, springs 21 may be provided which support the injection unit 5 on a stationary base 22.

We claim:

1. An injection molding machine comprising a machine frame, a stationary mold mounting plate and a movable mold mounting plate, each mounting plate carrying a mold portion, an injection unit, rigidly connected with the stationary mold mounting plate, which communicates with said mold portion of said stationary mold mounting plate, a closing mechanism connected to said movable mold mounting plate, said closing mechanism adapted to apply a closing force to the movable mold mounting plate to move the movable mold mounting plate in association with the stationary mold mounting plate, wherein the force applied by the closing mechanism is transmitted through the machine frame instead of through bar members causing slight tilting movement of the stationary mold mounting plate, wherein the injection unit is connected to the machine frame such that said injection unit participates in said slight tilting movement of the stationary mold mounting plate.

2. An injection moulding machine according to claim 1 characterized in that the injection unit together with the fixed mould mounting plate are connected to the machine frame by pivot pins.

3. An injection moulding machine according to claim 2 characterized in that the injection unit is supported on a stationary base by springs.

4. An injection molding machine, comprising a machine frame, a stationary mold mounting plate and a movable mold mounting plate, each mounting plate carrying a mold portion, an injection unit which communicates with said mold portion of said stationary mold mounting plate, a closing mechanism connected to said movable mold mounting plate, said closing mechanism adapted to apply a closing force to the movable mold mounting plate to move the movable mold mounting plate in association with the stationary mold mounting plate, wherein the force applied by the closing mechanism is transmitted through the machine frame instead of through bar members and wherein the stationary mold mounting plate is suspended on the machine frame by pivot pins, the support of the injection unit being suspended together with the stationary mold mounting plate.

5. An injection moulding machine according to claim 4 characterized in that the injection unit is supported on a bracket which is connected to a free end of the stationary mould mounting plate which forms a part of the machine frame.

* * * * *